2,715,636

QUINONEDIIMINE DERIVATIVES

John F. Carson, Berkeley, Calif., assignor to the United States of America as represented by the Secretary of Agriculture No Drawing. Application November 17, 1953,
Serial No. 392,780

3 Claims. (Cl. 260—396)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the synthesis of organic compounds. The objects of the invention include the provision of the new organic compound, N,N'-dicyclohexyl-2,5-dimethyl-1,4-benzoquinonediimine and methods for synthesizing it. Further objects of this invention will be obvious from the description herein.

In synthesizing the compounds of this invention, diacetyl is reacted with cyclohexylamine to produce N,N'-dicyclohexyl-2,5-dimethyl-2-hydroxy-cyclohexene(5)-1,4-diimine. This intermediate is then dehydrated by dissolving it in an alkanol to produce N,N'-dicyclohexyl-2,5-dimethyl-1,4-benzoquinonediimine. The reactions are illustrated by the following equations:

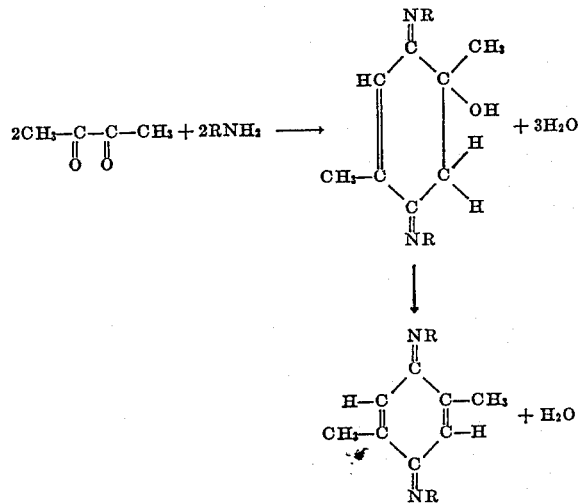

In these equations, R represents the cyclohexyl radical.

The following example illustrates the invention in greater detail:

(A) Fifty grams (0.5 mole) of anhydrous cyclohexylamine and 15 grams (0.17 mole) of anhydrous diacetyl were cooled to minus 10° C. and mixed in a 250 ml. flask with external cooling. The air in the flask was displaced by nitrogen and the reaction mixture kept at 5° C. for 24 hours. The resulting pale amber solution was then concentrated under vacuum at a temperature below 20° C. to form a microcrystalline mush to which 50 ml. of hexane was added. After permitting the mixture to stand at minus 20° C. overnight, it was filtered at minus 20° C. to yield 11 grams of N,N'-dicyclohexyl-2,5-dimethyl-2-hydroxy-cyclohexene(5)-1,4-diimine as a tan crystalline material. An additional 18 grams of this compound was obtained by keeping the filtrate in an acetone-Dry Ice bath for several days. The crude product was recrystallized from hexane to yield 9 grams of the pure compound in the form of colorless prisms. Additional product could be crystallized from the mother liquor. The purified N,N'-dicyclohexyl-2,5-dimethyl-2-hydroxy-cyclohexene(5)-1,4-diimine was subjected to analysis with the following results:

M. P. _____ 101–102° C.
Carbon _____ 76.1% (calc'd 75.9%).
Hydrogen _____ 10.1% (calc'd 10.19%).
Nitrogen _____ 8.71% (calc'd 8.85%).
Mol. wt _____ 315 (calc'd 316).
Ultraviolet absorption:
  Max=257 millimicrons; $e$=24,000 (isooctane).
  Max=263 millimicrons; $e$=22,400 (methanol).

(B) One gram of the cyclohexene diimine product as prepared above was dissolved in 100 ml. of methanol and allowed to stand three days at 25° C. The solution containing crystals was cooled to minus 20° C. and filtered to yield 700 mg. of N,N'-dicyclohexyl-2,5-dimethyl-1,4-benzoquinonediimine as yellow crystals. After recrystallizing from methanol this compound was subjected to analysis with the following results.

M. P. _____ 145.6–147° C.
Carbon _____ 80.3% (calc'd 80.48%).
Hydrogen _____ 10.1% (calc'd 10.13%).
Nitrogen _____ 9.27% (calc'd 9.39%).
Ultraviolet absorption in isooctane:
  Max=288 millimicrons; $e$=40,100.
  Inflection=295–300 millimicrons; $e$=35,500.

Referring to part A of the above example, the reaction requires equimolecular proportions of the reactants—diacetyl and cyclohexylamine. To accelerate the reaction it is preferred to use a large excess of the amine reactant. This reaction should be carried out at a low temperature, e. g., from about minus 25° C. to about +10° C., to minimize decomposition of the unstable cyclohexene diimine intermediate. Also to prevent decomposition, it is preferred to carry out the evaporation of excess cyclohexylamine and crystallization of the intermediate product at low temperatures, preferably +10° C. or below. In the example, the cyclohexene diimine product was recrystallized to prepare a pure sample for analytical purposes. This recrystallization step may be omitted and the dehydration carried out directly on the crude intermediate product.

It may be of interest to note that the reaction of diacetyl with cyclohexylamine to produce the cyclohexene diimine intermediate is unique. The reaction will not take place with other amines. For example, if the cyclohexyl amine is replaced by ethylamine, n-butylamine, sec. butylamine, or benzylamine, only dark oils or resins are formed.

Referring to part B of the example, the dehydration of the cyclohexene diimine intermediate to the quinonediimine final product is preferably carried out as soon as the intermediate is prepared because of its instability. The dehydration, which involves the removal of one molecule of water from the intermediate, may be performed by dissolving it in methanol and allowing to stand at room temperature (25° C.) for several days. Much more rapid reaction takes place if the methanol solution is boiled (about 65° C.); in such case the dehydration is complete in about 10–15 minutes. Instead of methanol, one can use other alkanols such as ethanol, propanol, isopropanol, the isomeric butanols, and so forth.

The compound, N,N'-dicyclohexyl-2,5-dimethyl-1,4-benzoquinonediimine, is stable and exhibits antioxidant properties, hence may be used as an antioxidant for mineral oils, rubber, glyceride oils, fats, lard, cereals, and other animal or vegetable materials which contain oils.

Further, the compound is a useful intermediate for organic syntheses. For example, it may be hydrogenated in the presence of platinum oxide to produce N,N'-dicyclohexyl-2,5-dimethyl-p-phenylenediamine. Acid hydrolysis of the quinonediimine yields 2,5-dimethyl-p-quinone.

Having thus described my invention, I claim:

1. As a new compound, N,N'-cyclohexyl-2,5-dimethyl-1,4-benzoquinonediimine.

2. A process for preparing N,N'-dicyclohexyl-2,5-dimethyl-1,4-benzoquinonediimine, which comprises reacting diacetyl with cyclohexylamine, dissolving the resulting compound in an alkanol and allowing said compound to remain in contact with the alkanol until dehydration occurs thus to form N,N'-dicyclohexyl-2,5-dimethyl-1,4-benzoquinonediimine.

3. A process for preparing N,N'-dicyclohexyl-2,5-dimethyl-1,4-benzoquinonediimine, which comprises dissolving N,N'-dicyclohexyl-2,5-dimethyl-2-hydroxy-cyclohexene(5)-1,4-diimine in an alkanol and allowing it to remain in contact with the alkanol until dehydration occurs thus to form N,N'-dicyclohexyl-2,5-dimethyl-1,4-benzoquinonediimine.

No references cited.